US 12,373,859 B2

(12) United States Patent
Duan-Porter et al.

(10) Patent No.: US 12,373,859 B2
(45) Date of Patent: Jul. 29, 2025

(54) BLOCKCHAIN REGISTERED CONTAINER UTILIZATION AT POINT OF SALE

(71) Applicant: Toshiba Global Commerce Solutions, Inc., Durham, NC (US)

(72) Inventors: Benjamin Duan-Porter, Eden Prairie, MN (US); Sarath Babu Raja Surya, Raleigh, NC (US); Phillip Monkowski, Apex, NC (US); Ping Cherng Lin, Durham, NC (US); John Wendler, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 114 days.

(21) Appl. No.: 18/112,732

(22) Filed: Feb. 22, 2023

(65) Prior Publication Data
US 2024/0281843 A1    Aug. 22, 2024

(51) Int. Cl.
*G06Q 30/0238*    (2023.01)
*G06Q 20/20*    (2012.01)
(Continued)

(52) U.S. Cl.
CPC ....... *G06Q 30/0238* (2013.01); *G06Q 20/202* (2013.01); *G06Q 20/367* (2013.01); *G06Q 20/3829* (2013.01); *G06Q 20/389* (2013.01)

(58) Field of Classification Search
CPC ....... G06Q 20/0238; G06Q 20/00–425; G06Q 30/00–08
(Continued)

(56) References Cited

U.S. PATENT DOCUMENTS 8,564,621 B2    10/2013    Branson
9,436,923 B1 *   9/2016    Sriram ............... H04L 9/3247
(Continued)

FOREIGN PATENT DOCUMENTS

WO    WO-2024209328 A1 *   10/2024

OTHER PUBLICATIONS

D. Mohl, NFTs Explained Quick: From Zero to Hero, Apr. 18, 2022, Mercari Engineering (available at https://engineering.mercari.com/en/blog/entry/20220414-nfts-explained-quick-from-zero-to-hero/).
(Continued)

*Primary Examiner* — Chenyuh Kuo
(74) *Attorney, Agent, or Firm* — Kaufman & Canoles, P.C.

(57) ABSTRACT

Systems and methods of verifying utilization of a blockchain registered container at POS are presented. In one exemplary embodiment, a method is performed by a POS system having a sensing device operable to sense an identifier specific to a container configured to transport items after checkout. The POS system is communicatively coupled to a blockchain network that includes network nodes that are collectively configured to operate a blockchain. The container identifier is specific to a cryptographic digital asset stored on the blockchain as a container identifier code. Further, the cryptographic digital asset includes a user identifier code, with the container identifier code and the user identifier code being included in a transaction entry of a block on the blockchain that is associated with the cryptographic digital asset. The method includes sending, to the blockchain, a request for block data associated with the cryptographic digital asset based on the container identifier.

20 Claims, 10 Drawing Sheets

(51) Int. Cl.
*G06Q 20/36* (2012.01)
*G06Q 20/38* (2012.01)

(58) Field of Classification Search
USPC .......................................................... 705/71
See application file for complete search history.

(56) References Cited

U.S. PATENT DOCUMENTS

| | | | |
|---|---|---|---|
| 10,769,700 B2 | 9/2020 | Hamilton | |
| 11,004,101 B2* | 5/2021 | Balfour | G06Q 20/204 |
| 11,403,630 B2 | 8/2022 | Dua | |
| 11,544,731 B2* | 1/2023 | Arora | G06Q 30/0225 |
| 12,238,232 B1* | 2/2025 | Steel | G06Q 30/0185 |
| 2011/0145706 A1 | 6/2011 | Wilson | |
| 2014/0274313 A1 | 9/2014 | Bala | |
| 2019/0279204 A1 | 9/2019 | Norton | |
| 2019/0311343 A1* | 10/2019 | Cantrell | G06Q 20/20 |
| 2020/0134656 A1 | 4/2020 | Padmanabhan | |
| 2021/0004858 A1 | 1/2021 | Arora | |
| 2021/0256070 A1 | 8/2021 | Tran | |
| 2021/0383461 A1 | 12/2021 | Andon | |
| 2022/0173893 A1 | 6/2022 | Basu | |
| 2022/0188839 A1 | 6/2022 | Andon | |
| 2022/0207119 A1 | 6/2022 | Andon | |

OTHER PUBLICATIONS

H. Christian, Blockchain Technology Can End a Multimillion Dollar Financial Fraud, Mar. 28, 2022, TotalRetail (available at https://www.mytotalretail.com/article/blockchain-technology-can-end-a-multimillion-dollar-financial-fraud/).

J. Mehta, D. Mehta, J. Jain, and S. Dholay, "Asset Tracking System Using Blockchain," 2021 Asian Conference on Innovation in Technology (ASIANCON), Pune, India, 2021, pp. 1-7, doi: 10.1109/ASIANCON51346.2021.9544543.

* cited by examiner

400e

---

BY ONE OF A SET OF NETWORK NODES THAT ARE COLLECTIVELY CONFIGURED TO OPERATE A BLOCKCHAIN HAVING BLOCKS, WITH EACH BLOCK HAVING A HEADER AND A BODY WITH ONE OR MORE TRANSACTION ENTRIES, THE HEADER HAVING A REFERENCE TO A PREVIOUS BLOCK IN THE BLOCKCHAIN AND A REFERENCE TO TRANSACTION ENTRIES OF A CURRENT BLOCK IN THE BLOCKCHAIN, WITH THE BLOCKCHAIN NETWORK BEING COMMUNICATIVELY COUPLED TO A POS SYSTEM HAVING A SENSING DEVICE OPERABLE TO SENSE AN IDENTIFIER SPECIFIC TO AND DISPOSED WITH A CONTAINER CONFIGURED TO TRANSPORT ONE OR MORE ITEMS UPON CHECKOUT OF THOSE ITEMS BY THE POS SYSTEM, THE CONTAINER IDENTIFIER BEING SPECIFIC TO A CRYPTOGRAPHIC DIGITAL ASSET STORED ON THE BLOCKCHAIN AS A CODE THAT REPRESENTS THE CONTAINER IDENTIFIER, THE CRYPTOGRAPHIC DIGITAL ASSET ALSO INCLUDES A CODE THAT REPRESENTS A USER IDENTIFIER, WITH THE CONTAINER IDENTIFIER CODE AND THE USER IDENTIFIER CODE BEING INCLUDED IN A TRANSACTION ENTRY OF A BLOCK IN THE BLOCKCHAIN THAT IS ASSOCIATED WITH THE CRYPTOGRAPHIC DIGITAL ASSET, RECEIVE, FROM THE POS SYSTEM OVER THE NETWORK, AN INDICATION THAT INCLUDES A REQUEST FOR BLOCK DATA ASSOCIATED WITH THE CRYPTOGRAPHIC DIGITAL ASSET, WITH THE REQUEST INDICATION HAVING THE CRYPTOGRAPHIC DIGITAL ASSET REFERENCE — 401e

↓

OBTAIN THE BLOCK DATA REQUEST AND THE CORRESPONDING BLOCKCHAIN REFERENCE BASED ON THE REQUEST INDICATION — 403e

↓

VERIFY THE BLOCK DATA REQUEST BASED ON THE CRYPTOGRAPHIC DIGITAL ASSET REFERENCE — 405e

↓

OBTAIN THE BLOCK DATA ASSOCIATED WITH THE CRYPTOGRAPHIC DIGITAL ASSET BASED ON THE CRYPTOGRAPHIC DIGITAL ASSET REFERENCE — 407e

↓

SEND, TO THE POS DEVICE OVER THE NETWORK, AN INDICATION THAT INCLUDES THE BLOCK DATA ASSOCIATED WITH THE CRYPTOGRAPHIC DIGITAL ASSET, WHICH INCLUDES THE CONTAINER IDENTIFIER CODE AND THE USER IDENTIFIER CODE — 409e

FIG. 4E

US 12,373,859 B2

BLOCKCHAIN REGISTERED CONTAINER UTILIZATION AT POINT OF SALE

BACKGROUND

Retailers use point of sale hardware and software systems (POS systems) to streamline checkout operations and to allow retailers to process sales, handle payments, and store transactions for later retrieval. POS systems generally comprise a number of components including POS terminals and bagging stations. In a retail environment, there can be multiple POS terminals in communication with a server over a network. POS systems can enable customers to scan retail items, determine and indicate the amount owed for those items, prepare and present invoices, allow customers to make payments to retailers for those items, and enable customers or retail staff to bag those items. The POS terminals can provide multiple payment options during checkout at the POS systems, with most payments being carried out using electronic payment systems in which the transaction is processed, validated, and mediated by a trusted third party such as a financial institution. The bagging stations can enable customers or retail staff to bag purchased retail items in shopping bags during checkout at the POS systems. The shopping bags can be single-use plastic bags made from various kinds of plastic, with many of these bags being improperly discarded and ending up as harmful plastic waste in the environment. Many retailers have encouraged the use of reusable shopping containers such as bags made from fabric, natural fibers, woven synthetic fibers, or the like. However, most U.S. retail customers do not bring their own reusable bags, with many reusable bags going unused by customers or being used by others.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 4E illustrates one embodiment of a method performed by a network node of a blockchain network of verifying utilization of a blockchain registered container at point of sale in accordance with various aspects as described herein.

DETAILED DESCRIPTION

Figure 1:
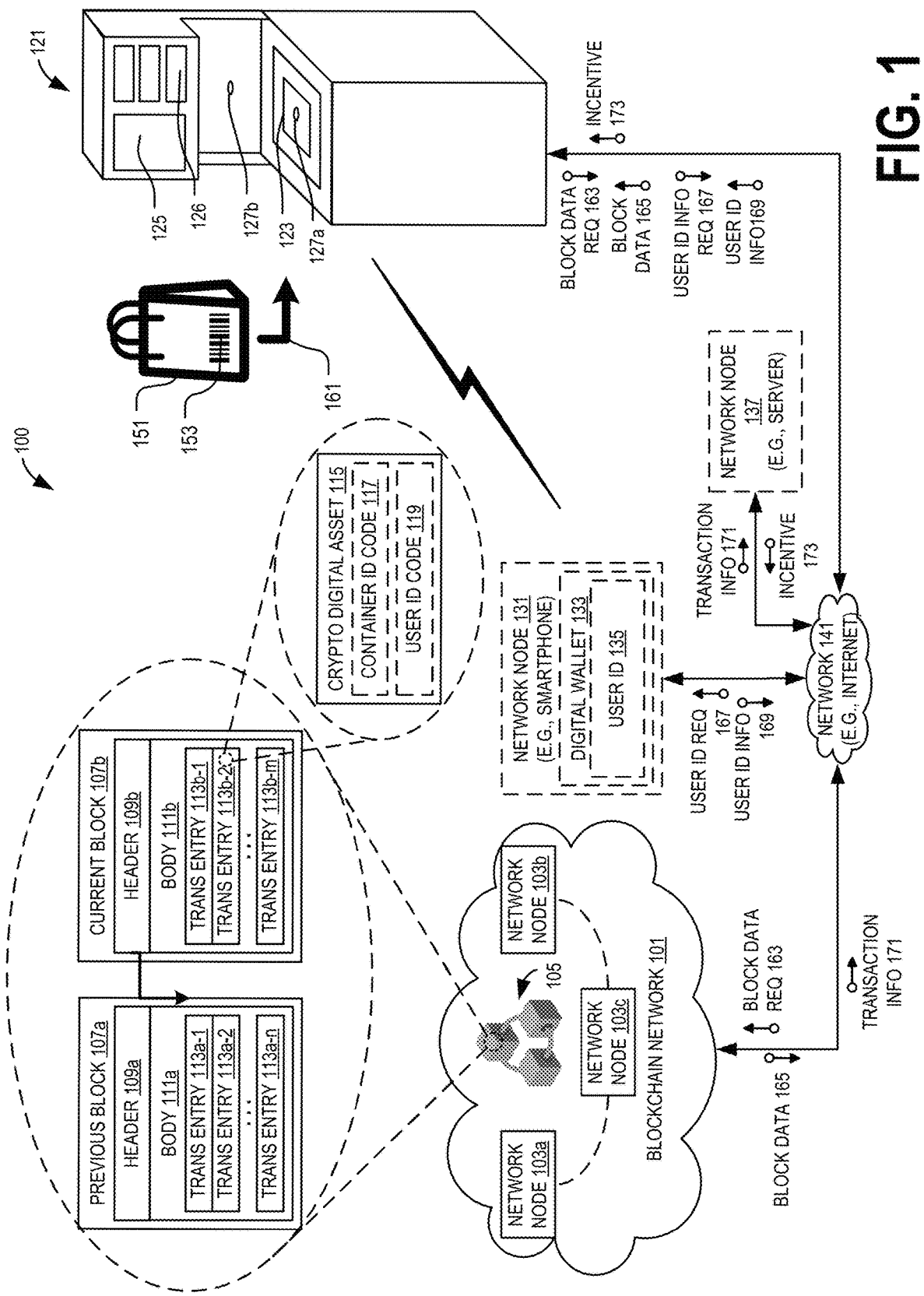
FIG. 1 illustrates one embodiment of a system of verifying utilization of a blockchain registered container at point of sale in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Some retailers may provide a fixed discount (e.g., 10%) for the use of reusable containers (e.g., bag, cup, mug, bucket, carrier). Further, retailers never seem to verify whether the reusable containers are re-used including by others. For instance, in commercial movie theaters, the theater staff does not verify whether a popcorn container is being refilled by the original purchaser. In the current disclosure, blockchain technology is applied to verify and track reusable containers to enable retailers to incentivize (e.g., discounts, rewards, promotions) the re-use of the reusable containers. Each time a reusable container is reused, the blockchain is updated with the corresponding transaction. Further, retailers can provide incentives to users for the reuse of the reusable containers, with such reuse being captured on the blockchain. Each reusable bag can be linked to a certain user via the blockchain so as to limit the re-use of the reusable container to that user as may be needed for certain incentive programs.

Some retailers may provide incentives to shoppers for using reusable containers, but due to the challenges of tracking the use of reusable containers, the incentives are primarily fixed discounts (e.g., 20% discount) and are based on the honor system. Further, many reusable containers are often lost or forgotten, requiring new reusable containers to be purchased, which results in further environmental waste. Often commercial movie theaters will offer free refills of a certain popcorn container (e.g., bucket), which can allow a customer to receive one, two, or an unlimited number of refills. However, commercial movie theaters find it difficult to enforce these refill limits as customers may share their popcorn containers with others or may obtain popcorn containers from trashcans so as to receive free refills. Accordingly, there is a need for improved techniques for verifying or tracking the utilization of reusable containers and for incentivizing the reuse of the reusable containers such as by retailers offering more targeted discounts based on the reuse of the reusable containers. In addition, other desirable features and characteristics of the present disclosure will become apparent from the subsequent detailed description and embodiments, taken in conjunction with the accompanying figures and the foregoing technical field and background.

In one exemplary embodiment, by storing an identifier of a reusable container on the blockchain and linking it to a user identifier via a mobile wallet, when the reusable container is reused to purchase retail items, the customer purchasing the items can be verified as the user of the reusable container and as such, the user can receive any discounts associated with the use of the reusable container. Further, the corresponding transaction by the customer can be recorded on the blockchain such as to further incentive the reuse of the same reusable container. For a popcorn container, this method would allow commercial movie theaters to accurately track the number of refills of popcorn containers by customers. The transactional nature of the blockchain provides additional benefits. In one example, for a user that no longer needs their reusable container, the user could transfer ownership of that reusable container to another user via a blockchain transaction. In another example, for a reusable container that is worn or no longer usable, the transaction information associated with that reusable container stored on the blockchain can be transferred to a new reusable bag owned by the same user, allowing the user to continue receiving incentives from the use of the old reusable container. In yet another example, the use of the blockchain can enable a user of a reusable container to receive incentives provided by other retailers who, through their servers, can obtain the transactions recorded on the blockchain that are associated with that reusable container. Further, a user of a reusable bag can be subject to multiple incentive programs from other providers, with each transaction associated with the reusable container being stored on the blockchain.

A blockchain is an immutable public or private digital ledger, once a transaction is recorded it cannot be modified. A blockchain can also enable a reusable container to be linked to a user identifier associated with a payment instrument, a user profile, a user account, or the like. By linking a reusable container recorded on the blockchain to a user identifier, a user can use his or her reusable container to verify and track the utilization of the reusable container such as by recording transactions associated with the utilization of the reusable container on the blockchain. By doing so, the reusable container can accumulate credit, which can be used to provide incentives such as discounts or payment for goods or services associated with the utilization of the reusable container. For instance, if a reusable container (e.g., shopping bag) is used at POS, the reusable container itself can build credit, eventually providing incentives or payment for goods or services. Since a blockchain is distributed, participants have a copy of the ledger for complete transparency. As such, any retailer can obtain access to this distributed data to incentivize the user of the reusable container.

Furthermore, the exemplary embodiments described herein include improved techniques to verify the utilization of a blockchain registered container at the point of sale. For example, FIG. 1 illustrates one embodiment of a system 100 of verifying utilization of a blockchain registered container 151 at point of sale in accordance with various aspect as described herein. In FIG. 1, the system 100 includes a POS system or device 121 (e.g., self-checkout device, assisted checkout device, self-service checkout device, checkout device) coupled to a blockchain network 101, a network node 131 (e.g., smartphone), and a network node 137 (e.g., server) over a network 141 (e.g., Internet, intranet). The POS device 121 can include one or more sensing devices 127a-b (e.g., camera, QR or bar code scanner, radio frequency identification (RFID) device, near field communication (NFC) device), a weight scale 123, the like, or any combination thereof. The POS device 121 can also include a user interface device 125, 126 (e.g., touchscreen display, LED, keypad, payment reader, printer, credit card reader), or the like. The weight scale 123 is operable to measure a weight of an item (e.g., produce) placed on the surface of the scale 123. The weight scale 123 can include an integrated sensing device 127a (e.g., scanner scale) that is operable to scan a quick response (QR) code or bar code positioned on an item that is moved over the window surface of the scale 123. The integrated sensing device 127a can include an RFID detector device that is operable to detect an RFID tag disposed with the container 151. Further, the integrated sensing device 127a can include a near field communication (NFC) device that is operable to communicate with an NFC device disposed with the container 151. Further, the POS device 121 can be operable to obtain a container identifier value from the sensed container identifier 153 captured by the sensing device 127a,b.

In FIG. 1, the blockchain network 101 can be a network having a set of network nodes 103a-b (e.g., servers) that are configured to store and manage a blockchain 105, including the generation, verification, and addition of new blocks to the blockchain 105. The blockchain 105 can include a set of blocks 107a-b, with each block 107a-b having a block header 109a-b and a body 111a-b having a set of transaction entries 113a-1-n, 113b-1-m. The block header 109b of a current block 107b can include a reference to a previous block 107a, a timestamp that represents a time when the current block 107b was generated, and a reference to the set of transaction entries 113b-1 to 113b-m included in the current block 107b. Every block 107a-b on the blockchain 105 can be verified by determining the reference values using the associated hashing function. The references included on the blockchain 105 can be hash values generated by applying one or more hashing algorithms to the corresponding data. In one example, the reference to the previous block 107a can be a hash value generated by applying a hashing algorithm to the block header 109a of the previous block 107a. The use of the references reflects the immutability of the blockchain 105, as a change to any transaction entry 113a-1-n, 113b-1-m on the blockchain 105 would result in a different reference value, which would result in the block header 109a-b of the corresponding block 107a-b to be changed, which in turn would result in a difference reference value for that block header 109a-b, requiring the block headers of all previous blocks to change. The set of transaction entries 113a-1-n, 113b-1-m can be represented by a hash tree. For example, the set of transaction entries 113a-1-n, 113b-1-m can be represented by a Merkle tree. A Merkle tree is a hash-based tree structure with each leaf node being a hash of a block 107a-b, and each non-leaf node being a hash of the children of each block 107a-b. Merkle trees can have a branching factor of two with each node having up to two children.

Each transaction entry 113a-1-n, 113b-1-m may represent a cryptographic digital asset 115 of a certain container 151 that includes a code 117 associated with the container identifier 153. Further, each cryptographic digital asset 115 can include a code 119 specific to a user identifier. The user identifier can be associated with a payment instrument (e.g., credit card, debit card, cryptographic wallet), a user profile, a user account (e.g., digital wallet), or the like. The blockchain 105 can include security methods such as the use of public-key cryptography, which may also be referred to as asymmetric key cryptography or encryption. Public-key cryptography uses pairs of mathematically-related keys (e.g., one public key and one private key) to authenticate data. The private key can be kept secret and can be used to decrypt data. The public key can be shared and can be used to authenticate or encrypt the data. Further, a private key is like a password that enables access to the corresponding cryptographic digital asset or the means to otherwise interact with the various capabilities that the blockchain 105 can support. In one example, each identifier code 117, 119 can include a cryptographic token and a public or private key. Each cryptographic digital asset 115 can be transferred to a digital wallet of another user with the container identifier code 117 being sent to a blockchain node 103a-c of the blockchain 105 and recorded on a new block to confirm the transfer of that cryptographic digital asset 115. In addition, each transfer of a cryptographic digital asset 115 to a digital wallet of a user may include sending an electronic message (e.g., email, text message) to the user with a unique key and a hashed address to the cryptographic digital asset 115. The network node 131 (e.g., smartphone) can be associated with the user identifier 119 and can be operable to process and manage transactions associated with the user identifier 119. The network node 137 (e.g., server) can be operationally coupled to the POS device 121 over the network 141 and can be operable to manage functions and operations performed by the POS device 121. A skilled artisan will readily recognize that any type of information can be stored in a transaction entry of a block and that data so stored may be stored in publicly readable form or in encrypted form depending on the use in which that particular blockchain is intended. While in one embodiment, the container identifier or the user identifier may be encrypted, in another embodiment, the container identifier or the user identifier may be provided in publicly available form depending on the use in which the blockchain is intended.

In operation during checkout of one or more retail items, the POS device 121 can output, for display on the user interface device 125, 126 (e.g., touch screen display), a visual representation associated with a selection to utilize the container 151 for checkout of one or more items by the POS system 121. In response, the POS device 121 can receive, from the user interface device 125, 126, an indication of a touch gesture detected at or about the visual representation associated with the selection to utilize the container 151. Further, the POS device 121 can output, for display on the presence sensitive display 125, 126, a visual representation associated with a request to position the container 151 on or about the surface of the weight scale 123 so that the container identifier 153 can be sensed from the container 151 and can then receive, from the sensing device 127a-b, an indication of the sensed container identifier disposed with the container 151. In response, the container 151 can be positioned on or about the surface of the weight scale 123, as represented by reference 161, so that the POS device 121 can receive, from the sensing device 127a-b, a sensed container identifier disposed with the container 151. The POS device 121 can determine the container identifier value based on the sensed container identifier. In one example, the container identifier 153 is a QR code or a barcode displayed on an outer surface of the container and the sensing device 127a-b (e.g., optical scanner, bar code scanner, camera) is operable to capture the QR code or the barcode displayed on the container 151. In another example, the container identifier 153 is a passive or active RFID tag disposed with the container and the sensing device 127a-b is an RFID detector device operable to sense the RFID device. In yet another example, the container identifier 153 is an NFC device and the sensing device 127a-b is an NFC device that is operable to communicate with the container identifier NFC device.

Furthermore, the POS system 121 can obtain a blockchain reference to the cryptographic digital asset 115 stored on the blockchain 105 based on the container identifier value. In one example, the container identifier value includes the blockchain reference. In another example, the container identifier value is linked to the blockchain reference. The POS system 121 can send, to a network node 103a-c of the blockchain network 101 over the network 141, an indication 163 that includes a request for block data associated with the cryptographic digital asset based on the container identifier 153 sensed from the container 151 during checkout of items by the POS system 121, with the request indication 163 including the cryptographic digital asset reference. The blockchain network node 103a-c can receive the request indication 163 and in response, the blockchain network node 103a-c can obtain the block data request and the corresponding blockchain reference from the request indication 163. Further, the blockchain network node 103a-c can validate the block data request based on the cryptographic digital asset reference. The blockchain network node 103a-c can then obtain the block data associated with the cryptographic digital asset 115 that includes the container identifier code 117 and the user identifier code 119. The blockchain network node 103a-c can send, to the POS device 121 over the network 141, an indication 165 that includes the block data associated with the cryptographic digital asset 115.

Moreover, the POS device 121 can receive the indication 165 that includes the block data associated with the cryptographic digital asset 115. The POS device 121 can obtain the container identifier code 117 based on the received block data. Further, the POS device 121 can verify the container identifier code 117 based on a public key or a private key associated with the container identifier code 117. The POS device 121 can also obtain the user identifier code 119 based on the received block data. The POS device 121 can obtain the user identifier based on the user identifier code 119 and a public key or a private key associated with the user identifier code 119. In addition, the POS device 121 can determine to verify that the container 151 utilized for the checkout of the one or more items by the POS device 121 is specific to the user for which the cryptographic digital asset 115 was transferred. In response, the POS device 121 can output, for display on the presence sensitive display 125, 126, a visual representation of a request to provide a user identifier associated with utilization of the container 151 during checkout of the one or more items by the POS device 121. The POS device 121 can receive, from the sensing device 127a-b, a sensed user identifier such as associated with a payment instrument (e.g., credit card, debit card, cryptographic wallet). In one example, the user identifier is sensed from a credit or debit card by a credit card reader. The POS device 121 can then obtain the user identifier based on the sensed payment instrument information. Further, the POS device 121 can obtain the user identifier associated with the cryptographic digital asset 115. The POS device 121 can then verify that the user identifier associated with the cryptographic digital asset 115 corresponds to the user identifier associated with the utilization of the container 151.

Additionally or alternatively, the POS device 121 can send, to the network node 131 over the network 141, an indication 167 that includes a request for a user identifier. The network node 131 (e.g., smartphone) can receive the request indication 167 and in response, can obtain the user identifier 135 such as from a user profile (e.g., smartphone), a user account (e.g., digital wallet 133, cryptocurrency wallet), or the like. The network node 131 can then send, to the POS device 121 over the network 141, an indication 169 that includes the user identifier 135. The POS device 121 can receive the user identifier indication 169 and can then obtain the user identifier 135 based on the user identifier indication 169. In addition, the POS device 121 can verify that the user identifier 135 associated with the cryptographic digital asset 115 corresponds to the user identifier associated with the utilization of the container 151.

In another embodiment, the POS system 121 can obtain an incentive (e.g., discount, promotion) to apply to one or more items during the checkout of those items by the POS system 121 based on transaction information associated with the utilization of the container 151 for the checkout responsive to determining that the user identifier associated with the utilization of the container 151 during the checkout corresponds to the user identifier obtained from the cryptographic digital asset 115.

In another embodiment, the network node 131 (e.g., server) can obtain transaction information 171 (e.g., item identifier, item description, item cost, item discount, number of items purchased, date purchased, POS identifier, store identifier, item weight, item volume, or the like) stored on the blockchain that is associated with the utilization of the container 151. The network node 131 can determine an incentive (e.g., discount, promotion) associated with the utilization of the container 151 based on the obtained transaction information. During checkout of one or more items by the POS system 121, the POS system 121 can send, to the network node 131, an indication that includes a request for a discount associated with the utilization of the container 151. The network node 131 can then send, to the POS system 121 over the network 141, an indication that includes the discount to apply to the one or more items by the POS system 121.

In another embodiment, the POS system 121 can send, to a payment processing network node (e.g., financial institution server) over the network 141, an indication that includes electronic payment instrument information and the transaction amount so that the payment processing network node is operable to process the electronic payment transaction based on the electronic payment instrument information and the transaction amount. In response, the POS system 121 can receive, from the payment processing network node over the network 141, an indication that includes a notification that the electronic payment transaction was processed.

In another embodiment, a transaction entry 113a-1-n, 113b-1-m for a cryptographic digital asset 115 recorded on the blockchain 105 can include the container identifier code 117, the user identifier code 119, and transaction information associated with the utilization of the container 151 for the checkout of one or more items by the POS device 121 so that a network node can obtain the transaction information to determine an incentive associated with the utilization of the container 151 for checkout of one or more items by the POS device 121.

Figure 2A:
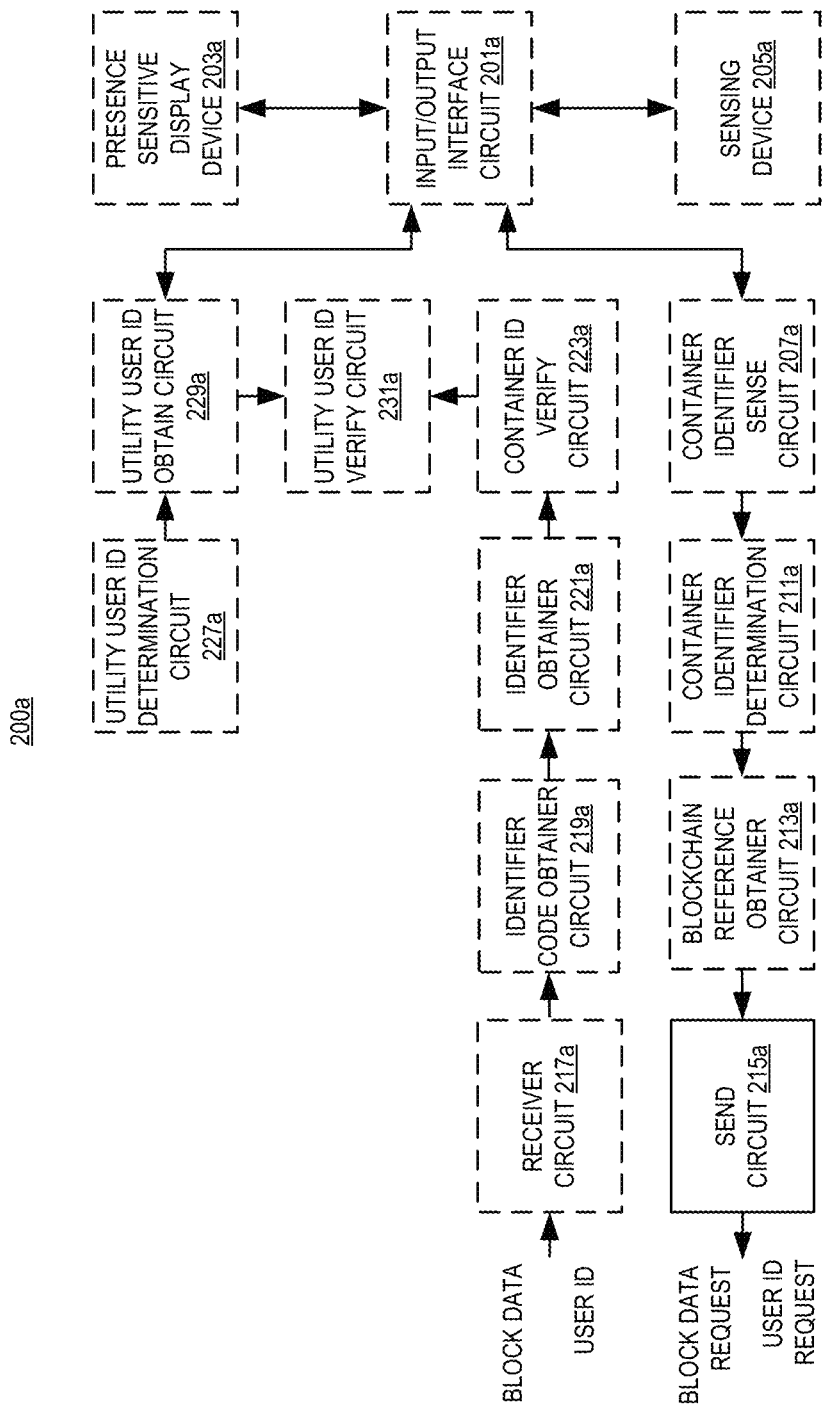
FIG. 2A illustrates one embodiments of a POS device in accordance with various aspects as described herein.

FIG. 2A illustrates one embodiment of a POS device 200a in accordance with various aspects as described herein. In FIG. 2A, the device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) described herein) may include for instance: an input/output interface circuit 201a operable to provide a communication interface to an input device, output device, or input and output device such as a presence sensitive display device 203a (e.g., touchpad display), a sensing device 205a (e.g., camera, QR or bar code scanner, RFID device, NFC device), LED, keypad, payment reader, printer, credit card reader, the like, or any combination thereof; a container identifier sense circuit 207a operable to obtain a sensed container identifier from the sensing device 205a via the input/output interface circuit 201a; a container identifier determination circuit 211a operable to obtain a container identifier value from the sensed container identifier; a blockchain reference obtainer circuit 213a operable to obtain a blockchain reference based on the container identifier value; a send circuit 215a operable to send information; a receiver circuit 217a operable to receive information; an identifier code obtainer circuit 219a operable to obtain a container or user identifier code from block data; an identifier obtainer circuit 221a operable to obtain a container or user identifier from the corresponding code; a container identifier verification circuit 223a operable to verify the container identifier; a container utilization user identifier determination circuit 227a operable to determine to verify that the user identifier associated with the cryptographic digital asset corresponds to the user identifier associated with the utilization of the container; a container utilization user identifier obtain circuit 229a operable to obtain the user identifier associated with the utilization of the container; and a container utilization verification circuit 231a operable to verify that the user identifier associated with the cryptographic digital asset corresponds to the user identifier associated with the utilization of the container.

Figure 2B:
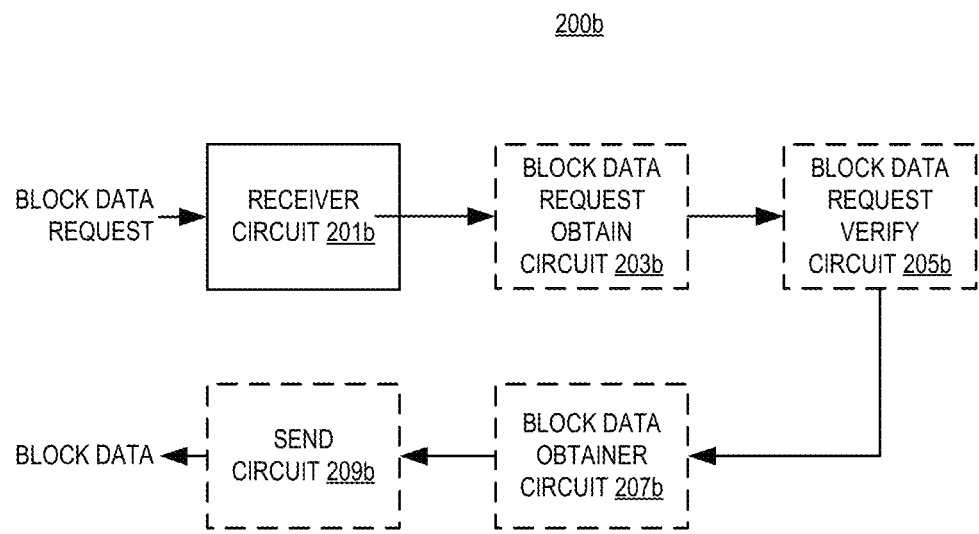
FIG. 2B illustrates one embodiment of a network node of a blockchain network in accordance with various aspects as described herein.

FIG. 2B illustrates one embodiment of a network node device 200b in accordance with various aspects as described herein. In FIG. 2B, the device 200b implements various functional means, units, or modules (e.g., via the processing circuitry 301b in FIG. 3B, via software code, or the like), or circuits. In one embodiment, these functional means, units, modules, or circuits (e.g., for implementing the method(s) herein) may include for instance: a receiver circuit 201b operable to receive communications; a block data request obtain circuit 203b operable to obtain a block data request and a cryptographic digital asset reference from the received request indication; a block data request validation circuit 205b operable to verify the block data request based on the cryptographic digital asset reference; a block data obtainer circuit 207b operable to obtain block data based on the cryptographic digital asset reference; and a send circuit 209b operable to send communications.

Figure 3A:
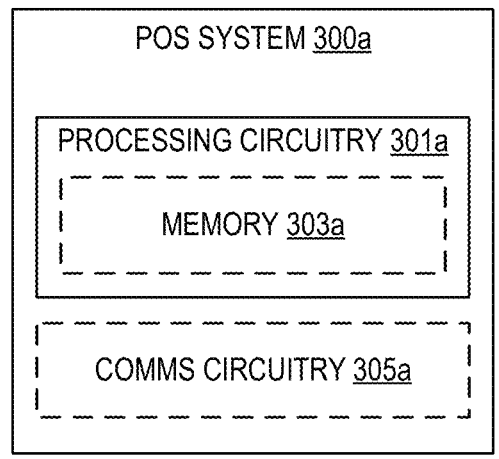
FIG. 3A illustrates another embodiment of a POS device in accordance with various aspects as described herein.

FIG. 3A illustrates another embodiment of a POS device 300a in accordance with various aspects as described herein. In FIG. 3A, the device 300a may include processing circuitry 301a that is operably coupled to one or more of the following: memory 303a and network communications circuitry 305a, the like, or any combination thereof. The network communication circuitry 305a is configured to transmit and/or receive information to and/or from one or more other network node devices via any communication technology. The processing circuitry 301a is configured to perform processing described herein, such as by executing instructions stored in memory 303a. The processing circuitry 301a in this regard may implement certain functional means, units, or modules.

Figure 3B:
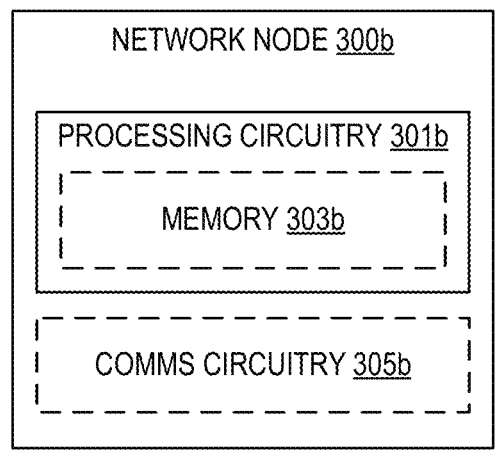
FIG. 3B illustrates another embodiment of a network node of a blockchain network in accordance with various aspects as described herein.

FIG. 3B illustrates another embodiment of a network node device 300b in accordance with various aspects as described herein. In FIG. 3B, the device 300b may include processing circuitry 301b that is operably coupled to one or more of the following: memory 303b and network communications circuitry 305b, the like, or any combination thereof. The network communication circuitry 305b is configured to transmit and/or receive information to and/or from one or more other network node devices via any communication technology. The processing circuitry 301b is configured to perform processing described herein, such as by executing instructions stored in memory 303b. The processing circuitry 301b in this regard may implement certain functional means, units, or modules.

Figure 4A:
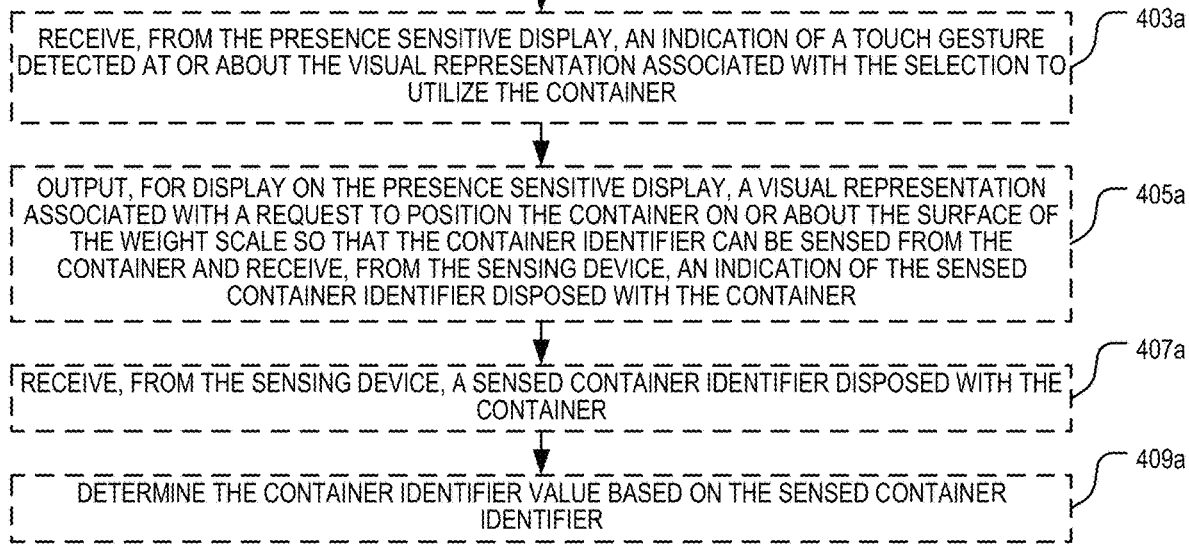
FIGS. 4A-D illustrate embodiments of a method performed by a POS device of verifying utilization of a blockchain registered container at point of sale in accordance with various aspects as described herein.

FIG. 4A illustrates one embodiment of a method 400a performed by the POS system 121, 200a, 300a, 500 of verifying utilization of a blockchain registered container at point of sale in accordance with various aspects as described herein. In FIG. 4A, the method 400a may start, for instance, at block 401a where it includes outputting, for display on a presence sensitive display of the POS system 121, 200a, 300a, 500, a visual representation associated with a selection to utilize the container for checkout of one or more items by the POS system 121, 200a, 300a, 500. At block 403a, the method 400a may include receiving, from the presence sensitive display, an indication of a touch gesture detected at or about the visual representation associated with the selection to utilize the container. The method 400a may include outputting, for display on the presence sensitive display, a visual representation associated with a request to position the container on or about the surface of the weight scale so that the container identifier can be sensed from the container and receiving, from the sensing device, an indication of the sensed container identifier disposed with the container, as represented by block 405a. At block 407a, the method 400a may include receiving, from the sensing device, a sensed container identifier disposed with the container. At block 409a, the method 400a may include determining the container identifier value based on the sensed container identifier.

Figure 4B:
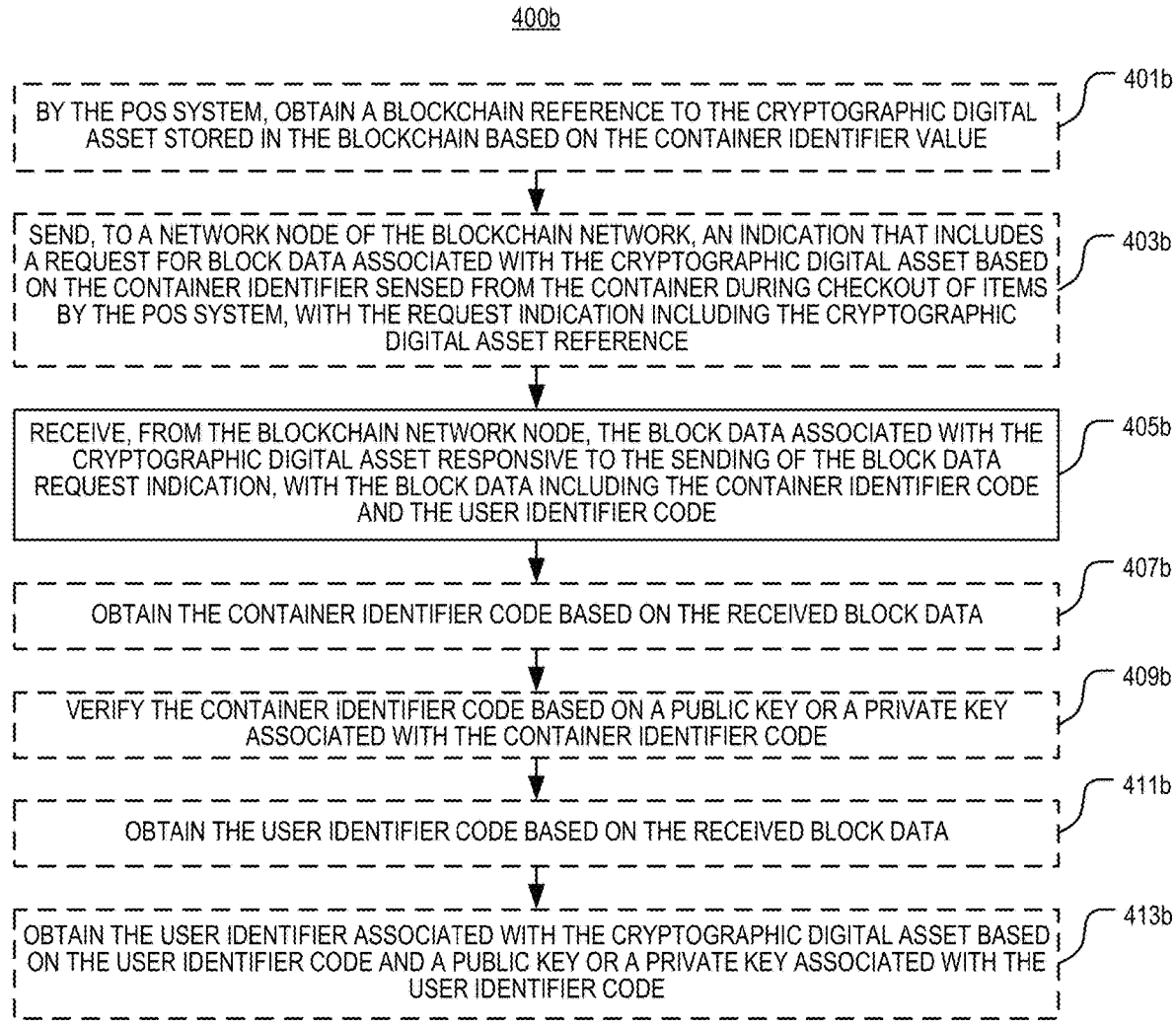

FIG. 4B illustrates another embodiment of a method 400b performed by the POS system 121, 200a, 300a, 500 of verifying utilization of a blockchain registered container at point of sale in accordance with various aspects as described herein. In FIG. 4B, the method 400b may start, for instance, at block 401b where it may include obtaining a blockchain reference to the cryptographic digital asset stored on the blockchain based on the container identifier value. At block 403b, the method 400b may include sending, to a network node of the blockchain network, an indication that includes a request for block data associated with the cryptographic digital asset based on the container identifier sensed from the container during the checkout. At block 405b, the method 400b includes receiving, from the blockchain network node, the block data associated with the cryptographic digital asset. At block 407b, the method 400b may include obtaining the container identifier code based on the received block data. At block 409b, the method 400b may include verifying the container identifier code based on a public key or a private key associated with the container identifier code. The method 400b may include obtaining the user identifier code based on the received block data, as represented by block 411b. At block 413b, the method 400b may include obtaining the user identifier associated with the cryptographic digital asset based on the user identifier code and a public key or a private key associated with the user identifier code.

Figure 4C:
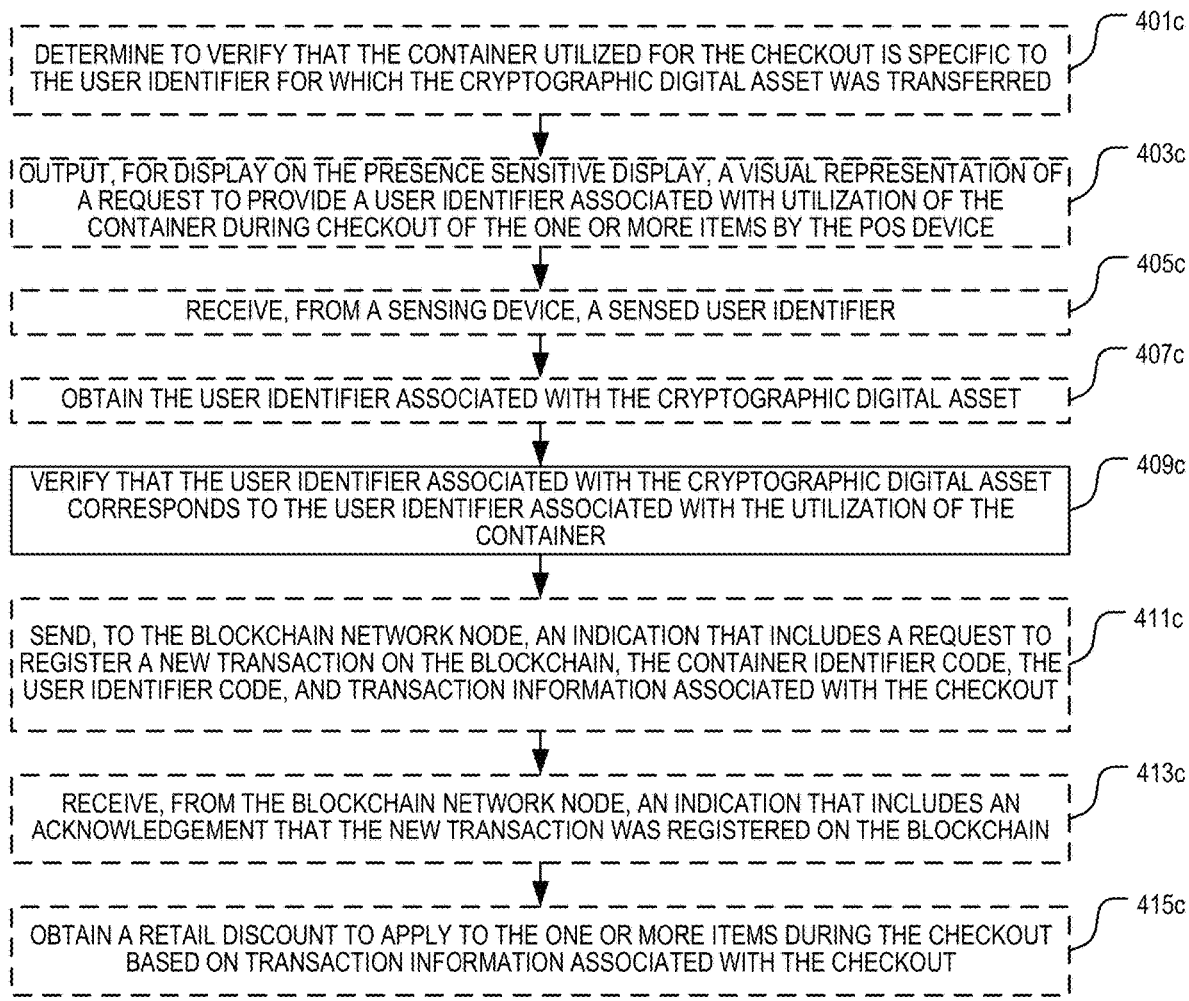

FIG. 4C illustrates another embodiment of a method 400c performed by the POS system 121, 200a, 300a, 500 of verifying utilization of a blockchain registered container at point of sale in accordance with various aspects as described herein. In FIG. 4C, the method 400c may start, for instance, at block 401c where it may include determining to verify that the container utilized for the checkout is specific to the user identifier for which the cryptographic digital asset was transferred. The method 400c may include outputting, for display on the presence sensitive display, a visual representation of a request to provide a user identifier associated with utilization of the container during the checkout, as represented by block 403c. At block 405c, the method 400c may include receiving, from a sensing device, a sensed user identifier disposed with the container. At block 407c, the method 400c may include obtaining the user identifier associated with the cryptographic digital asset. The method 400c includes verifying that the user identifier associated with the cryptographic digital asset corresponds to the user identifier associated with the utilization of the container, as represented by block 409c. At block 411c, the method 400c includes sending, to the blockchain network node, an indication that includes a request to register a new transaction on the blockchain, the container identifier code, the user identifier code, and transaction information associated with the checkout. The method 400c may include receiving, from the blockchain network node, an indication that includes an acknowledgement that the new transaction was registered on the blockchain, as represented by block 413c. At block 415c, the method 400c may include obtaining a retail discount to apply to the one or more items during the checkout based on transaction information associated with the checkout.

Figure 4D:
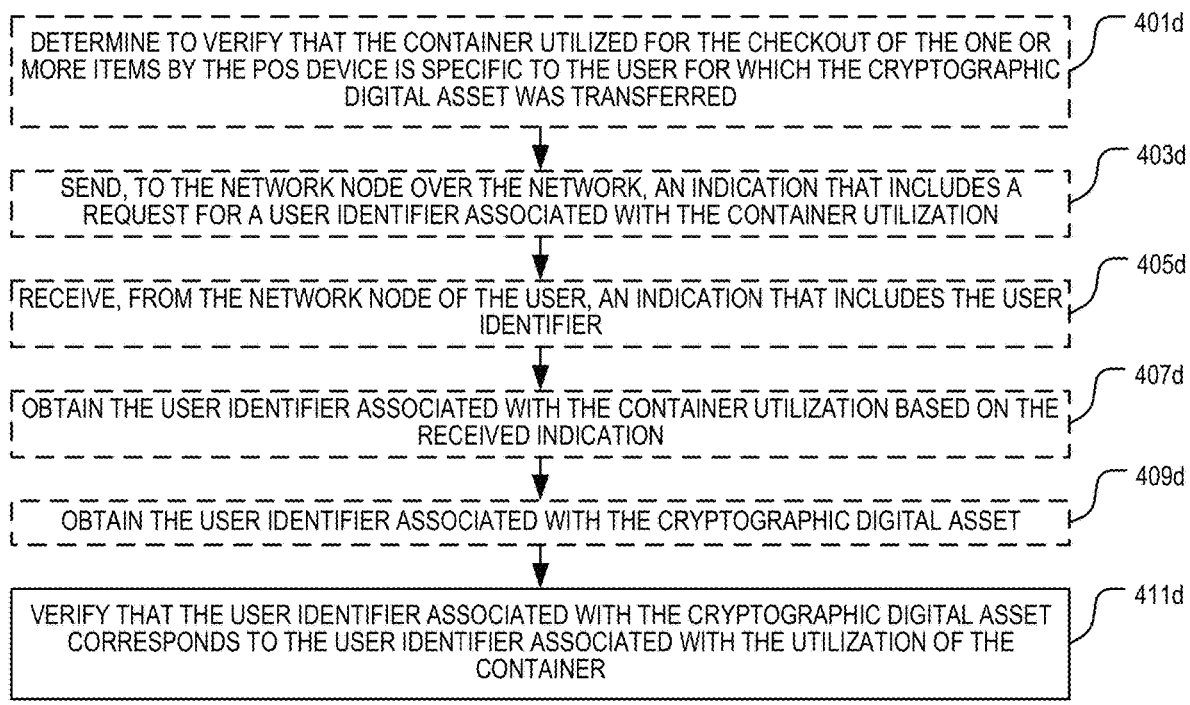

FIG. 4D illustrates another embodiment of a method 400d performed by the POS system 121, 200a, 300a, 500 of verifying utilization of a blockchain registered container at point of sale in accordance with various aspects as described herein. In FIG. 4D, the method 400d may start, for instance, at block 401d where it may include determining to verify that utilization of the container for the checkout corresponds to the user identifier associated with the cryptographic digital asset. At block 403d, the method 400d include sending, to a network node over the network, an indication that includes a request for a user identifier associated with the container utilization. At block 405d, the method 400d may include receiving, from the network node over the network, an indication that includes the user identifier associated with the container utilization. The method 400d may include obtaining the user identifier associated with the container utilization based on the received indication, as represented by block 407d. At block 409d, the method 400d may include obtaining the user identifier associated with the cryptographic digital asset. The method 400d includes verifying that the user identifier associated with the cryptographic digital asset corresponds to the user identifier associated with the container utilization, as represented by block 411d.

FIG. 4E illustrates one embodiment of a method 400e performed by a network node 103a-c, 200b, 300b of a blockchain network 101 of verifying utilization of a blockchain registered container at point of sale in accordance with various aspects as described herein. In FIG. 4E, the method 400e may start, for instance, at block 401e where it may include receiving, from the POS system over the network, an indication that includes a request for block data associated with the cryptographic digital asset and the cryptographic digital asset reference. At block 403e, the method 400e may include obtaining the block data request and the corresponding blockchain reference based on the request indication. The method 400e may include verifying the block data request based on the cryptographic digital asset reference, as referenced by block 405e. At block 407e, the method 400e may include obtaining the block data associated with the cryptographic digital asset based on the cryptographic digital asset reference. At block 409e, the method 400e includes sending, to the POS device over the network, an indication that includes the block data associated with the cryptographic digital asset.

Figure 5:
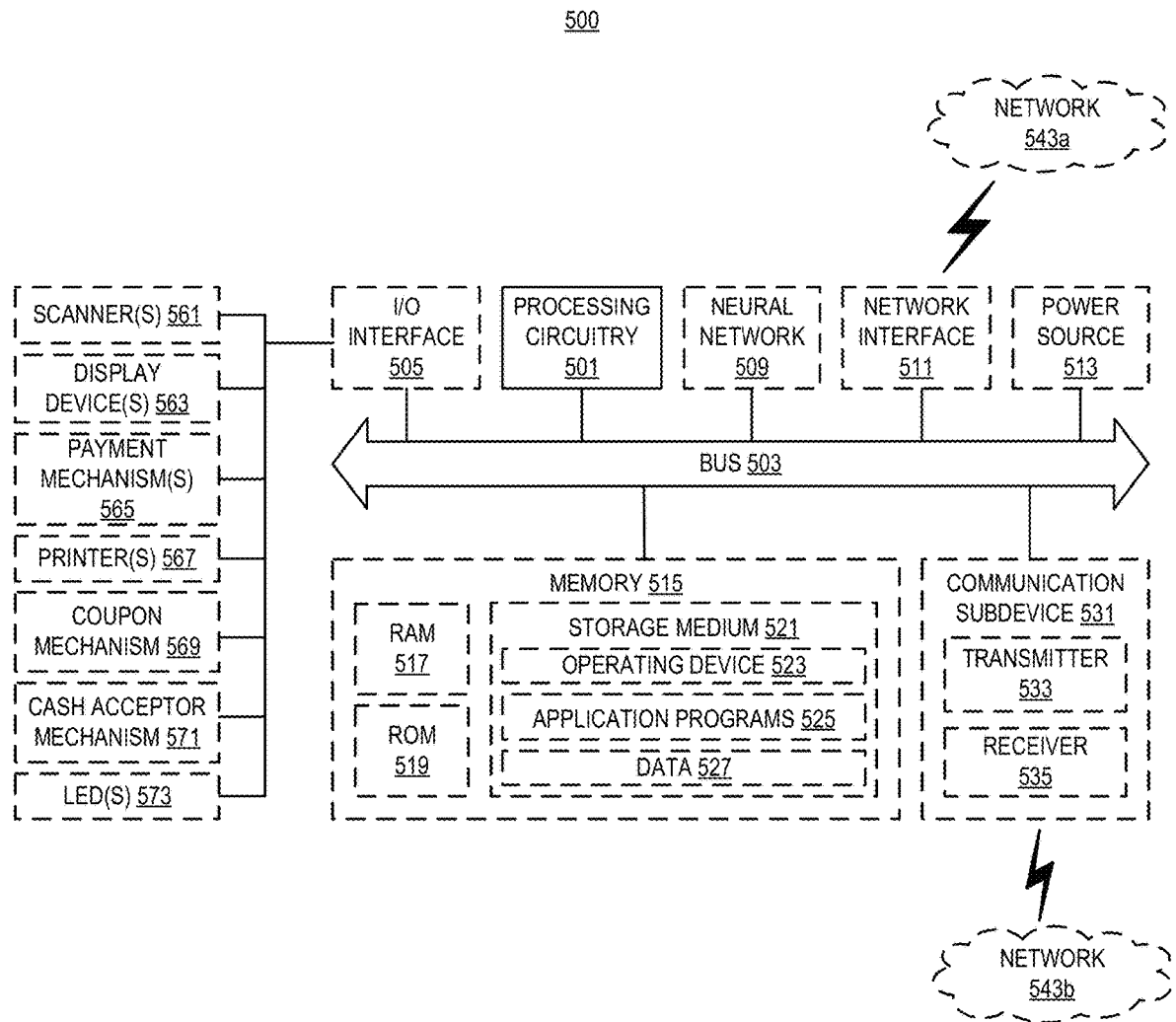
FIG. 5 illustrates another embodiment of a POS device in accordance with various aspects as described herein.

FIG. 5 illustrates another embodiment of a POS device 500 in accordance with various aspects as described herein. In FIG. 5, device 500 includes processing circuitry 501 that is operatively coupled to input/output interface 505, neural network circuit 509, network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device may use the same type of interface port as an input device. For example, a USB port or a Bluetooth port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, a scanner, etc.), a scanner, a weight scale, a microphone, a sensor, a mouse, a trackball, a directional pad, a trackpad, a scroll wheel, a smartcard, and the like. In one example, the input device may be a combined scale and scanner. The scale can be operable to weigh one or more items placed on a transparent window associated with the combined scale and scanner. The scanner can be operable to scan an identifier (e.g., barcode, Q/R code, RF ID) disposed with a scanned item. The presence-sensitive display may include a capacitive or resistive touch sensor to sense input from a user. As shown in FIG. 5, the input/output interface 505 can be configured to provide a communication interface to various input/output components such as a scanners or sensors 561, a display device 563, a payment processing mechanism 565, a printer 567, a coupon slot mechanism 569, a cash acceptor mechanism 571, a light emitting device 573, the like, or any combination thereof. A sensor may be, for instance, an accelerometer, a gyroscope, an RFID detector device, an NFC detector device, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a POS device having a sensing device operable to sense an identifier specific to and disposed with a container configured to transport one or more items associated with checkout of those items by the POS device. Further, the POS device is communicatively coupled over a network to a blockchain network that includes network nodes that are collectively configured to operate a blockchain having blocks. Each block includes a header and a body with one or more transaction entries. The header includes a reference to a previous block on the blockchain and a reference to the transaction entries of the current block on the blockchain. In addition, the container identifier is specific to a cryptographic digital asset stored on the blockchain as a code that represents the container identifier. The cryptographic digital asset also includes a code that represents a user identifier associated with the cryptographic digital asset. The container identifier code and the user identifier code are included in a transaction entry of a block on the blockchain that is associated with the cryptographic digital asset. The method includes sending, to a network node of the blockchain network over the network, an indication that includes a request for block data associated with the cryptographic digital asset based on the container identifier sensed from the container during checkout of one or more items by the POS device so that the POS system is enabled to determine that a user identifier associated with utilization of the container during the checkout corresponds to the user identifier obtained from the cryptographic digital asset.

In another exemplary embodiment, the method further includes receiving, from the blockchain network node over the network, the block data associated with the cryptographic digital asset responsive to the sending of the block data request indication.

In another exemplary embodiment, the method further includes obtaining the user identifier code associated with the cryptographic digital asset based on the received block data.

In another exemplary embodiment, the method further includes obtaining the user identifier associated with the cryptographic digital asset based on the user identifier code and a public key or a private key associated with the user identifier code.

In another exemplary embodiment, the method further includes obtaining the user identifier associated with the utilization of the container during the checkout. The method further includes determining that the user identifier associated with the utilization of the container during the checkout corresponds to the user identifier obtained from the cryptographic digital asset.

In another exemplary embodiment, the step of obtaining the user identifier associated with the utilization of the container includes both obtaining payment instrument information for a transaction associated with the checkout and then obtaining the user identifier associated with the utilization of the container based on the payment instrument information.

In another exemplary embodiment, the step of obtaining the payment instrument information includes receiving, from a sensing device of the POS device, the payment instrument information.

In another exemplary embodiment, the step of obtaining the payment instrument information includes both sending, by the POS device, to a network node over the network, an indication that includes a request for the payment instrument information and then receiving, by the POS device, from the network node over the network, the payment instrument information. Further, the network node is operable to obtain the payment instrument information from a digital wallet application of the network node.

In another exemplary embodiment, the method further includes obtaining transaction information associated with the checkout. The method further includes sending, by the POS device, to the blockchain network node over the network, an indication that includes a request to register a new transaction on the blockchain responsive to determining that a user identifier associated with the utilization of the container during the checkout corresponds to the user identifier obtained from the cryptographic digital asset. Further, the indication includes the container identifier code, the user identifier code, and the transaction information associated with the checkout.

In another exemplary embodiment, the method further includes receiving, by the POS device, from the blockchain network node over the network, an indication that includes an acknowledgement that the new transaction was registered on the blockchain.

In another exemplary embodiment, a network node is enabled to determine a promotion specific to the utilization of the container based on the checkout information obtained from the blockchain.

In another exemplary embodiment, the method further includes obtaining a retail discount to apply to the one or more items during the checkout based on transaction information associated with the checkout responsive to determining that the user identifier associated with the utilization of the container during the checkout corresponds to the user identifier obtained from the block.

In another exemplary embodiment, the step of obtaining the retail discount includes obtaining the transaction information associated with the checkout and sending, by the POS device, to a network node over the network, the transaction information so that the network node is enabled to determine the retail discount to apply to the one or more items during the checkout based on the transaction information associated with the checkout. the step of obtaining the retail discount also includes receiving, by the POS system, from the network node over the network, an indication that includes the retail discount to apply to the one or more items during the checkout by the POS system.

In another exemplary embodiment, the container identifier code includes a cryptographic token and a public key. Further, a private key associated with the container identifier code is issued to a digital wallet account associated with the cryptographic digital asset.

In another exemplary embodiment, the user identifier code includes a cryptographic token and a public key. Further, a private key associated with the user identifier code is issued to a digital wallet account associated with the user identifier.

In another exemplary embodiment, the container is a reusable shopping bag composed of a non-plastic material.

In another exemplary embodiment, the user identifier associated with the utilization of the container during the checkout is associated with a payment instrument.

In one exemplary embodiment, a POS device includes a sensing device operable to sense an identifier specific to and disposed with a container configured to transport one or more items associated with checkout of those items by the POS device. Further, the POS device is communicatively coupled over a network to a blockchain network that includes network nodes that are collectively configured to operate a blockchain having blocks. Each block includes a header and a body with one or more transaction entries. The header includes a reference to a previous block on the blockchain and a reference to the transaction entries of the current block on the blockchain. The container identifier is specific to a cryptographic digital asset stored on the blockchain as a code that represents the container identifier. The cryptographic digital asset also includes a code that represents a user identifier associated with the cryptographic digital asset. In addition, the container identifier code and the user identifier code are included in a transaction entry of a block on the blockchain that is associated with the cryptographic digital asset. The POS device further includes processing circuitry and a memory, with the memory containing instructions executable by the processing circuitry whereby the processing circuitry is configured to send, to a network node of the blockchain network over the network, an indication that includes a request for block data associated with the cryptographic digital asset based on the container identifier sensed from the container during checkout of the one or more items by the POS device so that the POS system is enabled to determine that a user identifier associated with utilization of the container during the checkout of the one or more items by the POS system corresponds to the user identifier obtained from the cryptographic digital asset.

In another exemplary embodiment, the memory includes further instructions executable by the processing circuitry whereby the processing circuitry is configured to: receive, from the blockchain network node over the network, the block data associated with the cryptographic digital asset responsive to the sending of the block data request indication; obtain, based on the received block data, the user identifier code based on the received block data; obtain the user identifier based on the user identifier code and a public key or a private key associated with the user identifier code; obtain a user identifier associated with the utilization of the container during the checkout of the one or more items by the POS device; and determine that the user identifier associated with the utilization of the container during the checkout of the one or more items by the POS system corresponds to the user identifier obtained from the block.

In another exemplary embodiment, the memory includes further instructions executable by the processing circuitry whereby the processing circuitry is configured to: obtain information associated with the checkout of the one or more items by the POS device; and send, to the blockchain network node over the network, an indication that includes a request to register a new transaction on the blockchain responsive to determining that a user identifier associated with the utilization of the container during the checkout of the one or more items by the POS system corresponds to the user identifier obtained from the block, with the indication including the container identifier code, the user identifier code, and transaction information associated with the checkout.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

sensing, by a point of sale (POS) device via a sensing device of the POS device, a container identifier disposed on a container during a checkout transaction at the POS device, wherein the container is configured to transport one or more items associated with the checkout transaction of the one or more items at the POS device;

wherein the POS device is communicatively coupled over a network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain;

wherein a blockchain reference for a cryptographic digital asset associated with the container is stored on the blockchain, wherein a blockchain transaction entry associated with the cryptographic digital asset includes a container identifier code and a user identifier code associated with the cryptographic digital asset, wherein the container identifier code is associated with the container identifier, wherein the user identifier code is also associated with a payment instrument applied to the checkout transaction;

obtaining, by the POS device, a user identifier associated with utilization of the container during the checkout transaction at the POS device;

sending, by the POS device, to a network node of the blockchain network over the network, a first indication that includes a request for a block data associated with the cryptographic digital asset, wherein the request includes the blockchain reference;

receiving, by the POS device from the network node over the network, a second indication that includes the block data associated with the cryptographic digital asset;

obtaining, by the POS device, the container identifier code and the user identifier code associated with the cryptographic digital asset based on the obtained block data; and verifying, by the POS device, ownership of the container by determining that the user identifier associated with the utilization of the container during the checkout transaction corresponds to the user identifier code obtained from the block data associated with the cryptographic digital asset.

2. The method of claim 1, further comprising:
receiving, by the POS device, from the blockchain network node over the network, the block data associated with the cryptographic digital asset responsive to the sending of the first indication including the request for the block data.

3. The method of claim 1, further comprising:
obtaining, by the POS device, the blockchain reference of the cryptographic digital asset.

4. The method of claim 1, further comprising:
obtaining, by the POS device, the user identifier associated with the cryptographic digital asset based on the user identifier code and a public key or a private key associated with the user identifier code.

5. The method of claim 1, further comprising:
determining, by the POS device, that the user identifier associated with the utilization of the container during the checkout transaction corresponds to the user identifier code obtained from the block data associated with the cryptographic digital asset.

6. The method of claim 1, wherein the obtaining the user identifier associated with the utilization of the container includes:
obtaining payment instrument information associated with the checkout transaction.

7. The method of claim 6, wherein the obtaining the payment instrument information includes:
receiving, via the sensing device of the POS device, the payment instrument information.

8. The method of claim 6, wherein the obtaining the payment instrument information includes:
sending, by the POS device, to a network node over the network, an indication that includes a request for the payment instrument information; and
receiving, by the POS device, from the network node over the network, the payment instrument information, with the network node being operable to obtain the payment instrument information from a digital wallet application of the network node.

9. The method of claim 1, further comprising:
obtaining, by the POS device, transaction information associated with the checkout transaction; and
sending, by the POS device, to the blockchain network node over the network, a third indication that includes a request to register a new transaction on the blockchain responsive to determining that the user identifier associated with the utilization of the container during the checkout transaction corresponds to the user identifier code obtained from the block data associated with the cryptographic digital asset, with the third indication including the container identifier code, the user identifier code, and the transaction information associated with the checkout transaction.

10. The method of claim 9, further comprising:
receiving, by the POS device, from the blockchain network node over the network, a fourth indication that includes an acknowledgement that the new transaction was registered on the blockchain.

11. The method of claim 9, wherein a network node that is communicatively coupled to the POS device over the network is enabled to determine a promotion specific to the utilization of the container based on the checkout transaction information obtained from the blockchain.

12. The method of claim 1, further comprising:
in response to determining that the user identifier associated with the utilization of the container during the checkout transaction corresponds to the user identifier code obtained from the block data associated with the cryptographic digital asset, obtaining, by the POS device, a retail discount to apply to the one or more items during the checkout transaction based on transaction information associated with the checkout transaction.

13. The method of claim 12, wherein the obtaining the retail discount includes:
obtaining, by the POS device, the transaction information associated with the checkout transaction;
sending, by the POS device, to a network node over the network, the transaction information so that the network node is enabled to determine the retail discount to apply to the one or more items during the checkout transaction at the POS device based on the transaction information associated with the checkout transaction; and
receiving, by the POS device, from the network node over the network, a fifth indication that includes the retail discount to apply to the one or more items during the checkout transaction by the POS device.

14. The method of claim 1, wherein the container identifier code includes a cryptographic token and a public key, with a private key associated with the container identifier code being issued to a digital wallet account associated with the cryptographic digital asset.

15. The method of claim 1, wherein the user identifier code includes a cryptographic token and a public key, with a private key associated with the user identifier code being issued to a digital wallet account associated with the cryptographic digital asset.

16. The method of claim 1, wherein the container is a reusable shopping bag composed of a non-plastic material.

17. The method of claim 1, wherein the user identifier associated with the utilization of the container is associated with a digital wallet associated with the payment instrument.

18. A point of sale (POS) device, comprising:
a sensing device;
a processing circuitry; and
a memory storing instructions that, when executed by the processing circuitry, cause the processing circuitry to:
sense, via the sensing device, a container identifier disposed on a container during a checkout transaction at the POS device, wherein the container is configured to transport one or more items associated with the checkout transaction of the one or more items at the POS device;
wherein the POS device is communicatively coupled over a network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain;

wherein a blockchain reference for a cryptographic digital asset associated with the container is stored on the blockchain, wherein a blockchain transaction entry associated with the cryptographic digital asset includes a container identifier code and a user identifier code associated with the cryptographic digital asset, wherein the container identifier code is associated with the container identifier, wherein the user identifier code is also associated with a payment instrument applied to the checkout transaction;

obtain a user identifier associated with utilization of the container during the checkout transaction at the POS device;

send, to a network node of the blockchain network over the network, a first indication that includes a request for block data associated with the cryptographic digital asset, wherein the request includes the blockchain reference;

receive, from the network node over the network, a second indication that includes the block data associated with the cryptographic digital asset;

obtain the container identifier code and the user identifier code associated with the cryptographic digital asset from the obtained block data; and verify ownership of the container by determining that the user identifier associated with the utilization of the container during the checkout transaction of one or more items by the POS device corresponds to the user identifier code obtained from the block data associated with the cryptographic digital asset.

19. The POS device of claim 18, wherein the memory includes further instructions that, when executed by the processing circuitry, cause the processing circuitry:

receive, from the blockchain network node over the network, the block data associated with the cryptographic digital asset responsive to the sending of the first indication including the request for the block data;

obtain, based on the received block data, the user identifier code associated with the cryptographic digital asset;

obtain the user identifier associated with the cryptographic digital asset based on the user identifier code and a public key or a private key associated with the user identifier code;

obtain a user identifier associated with the utilization of the container during the checkout transaction; and determine that the user identifier associated with the utilization of the container during the checkout transaction corresponds to the user identifier code obtained from the block data associated with the cryptographic digital asset.

20. The POS device of claim 19, wherein the memory includes further instructions that, when executed by the processing circuitry, further cause the processing circuitry is to:

obtain transaction information associated with the checkout transaction; and send, to the blockchain network node over the network, a third indication that includes a request to register a new transaction on the blockchain responsive to determining that the user identifier associated with the utilization of the container during the checkout transaction corresponds to the user identifier code obtained from the block data associated with the cryptographic digital asset, with the third indication including the container identifier code, the user identifier code associated with the cryptographic digital asset, and transaction information associated with the checkout transaction.

* * * * *